United States Patent
Chan

(10) Patent No.: US 8,352,398 B2
(45) Date of Patent: Jan. 8, 2013

(54) TIME-BASED CONFLICT RESOLUTION

(75) Inventor: Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 641 days.

(21) Appl. No.: 12/582,589

(22) Filed: Oct. 20, 2009

(65) Prior Publication Data

US 2011/0093422 A1   Apr. 21, 2011

(51) Int. Cl.
*G06F 17/00* (2006.01)
*G06N 5/00* (2006.01)

(52) U.S. Cl. .......................... 706/46; 718/100; 717/140
(58) Field of Classification Search ........................ None
See application file for complete search history.

(56) References Cited

U.S. PATENT DOCUMENTS

| 2004/0139434 A1* | 7/2004 | Blythe et al. ................. 718/100 |
| 2010/0088744 A1* | 4/2010 | Cox et al. ......................... 726/2 |

* cited by examiner

*Primary Examiner* — Kakali Chaki
*Assistant Examiner* — Kalpana Bharadwaj
(74) *Attorney, Agent, or Firm* — Hickman Palermo Truong Becker Bingham Wong LLP

(57) ABSTRACT

A conflict resolution mechanism collects statistical data regarding how much time certain common actions or waits take. For example, the mechanism may collect statistics on disk I/O for each disk device. Statistics may include the average access time, for example. Such statistics may be collected over a sliding window of time. With the statistical data that the mechanism collects, the mechanism can make a more intelligent judgment regarding whether a process is in a "hanging" condition. For example, if the average I/O to a disk is 10 seconds for the past hour, and if a process is doing disk I/O to that disk for 5 seconds, then the mechanism will not yet determine that the process is hanging. In order to determine whether the process is hanging, the mechanism looks at the average time and the longest time for the particular actions that the process is performing.

26 Claims, 2 Drawing Sheets

TIME-BASED CONFLICT RESOLUTION

FIELD OF THE INVENTION

The present invention relates generally to resolving conflicts that arise from multiple processes attempting to access a resource simultaneously.

BACKGROUND

Under existing approaches for resource conflict resolution, a process or session may be declared as being in a "hanging" condition based on the fact that it is waiting for a resource for a period of time. For example, a process may be waiting for a disk I/O to return for 5 seconds. Consequently, an operating environment supervisor may conclude that the process is hanging. Since this process may be holding resources for which other processes are waiting, the operating environment supervisor may try to resolve the resource conflict by killing the process that is waiting for the I/O. Often, this is a correct approach, but in some environments, a disk I/O may actually take 5 seconds or longer, depending on the hardware configuration, system load, etc. Hence, the process' action might be terminated prematurely even though the process is only taking an amount of time that is normal in the process' environment.

Different hardware configurations will operate at different speeds. Finding an appropriate "timeout" value that would be applicable to all of the many different hardware configurations would be difficult, if not impossible. If a too-short timeout value is imposed on a particularly slow hardware configuration, then an undue quantity of processes may be terminated even though those processes would actually have completed their work if they had been allowed to live for at least a while longer. In such a situation, few processes may get any work done at all.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
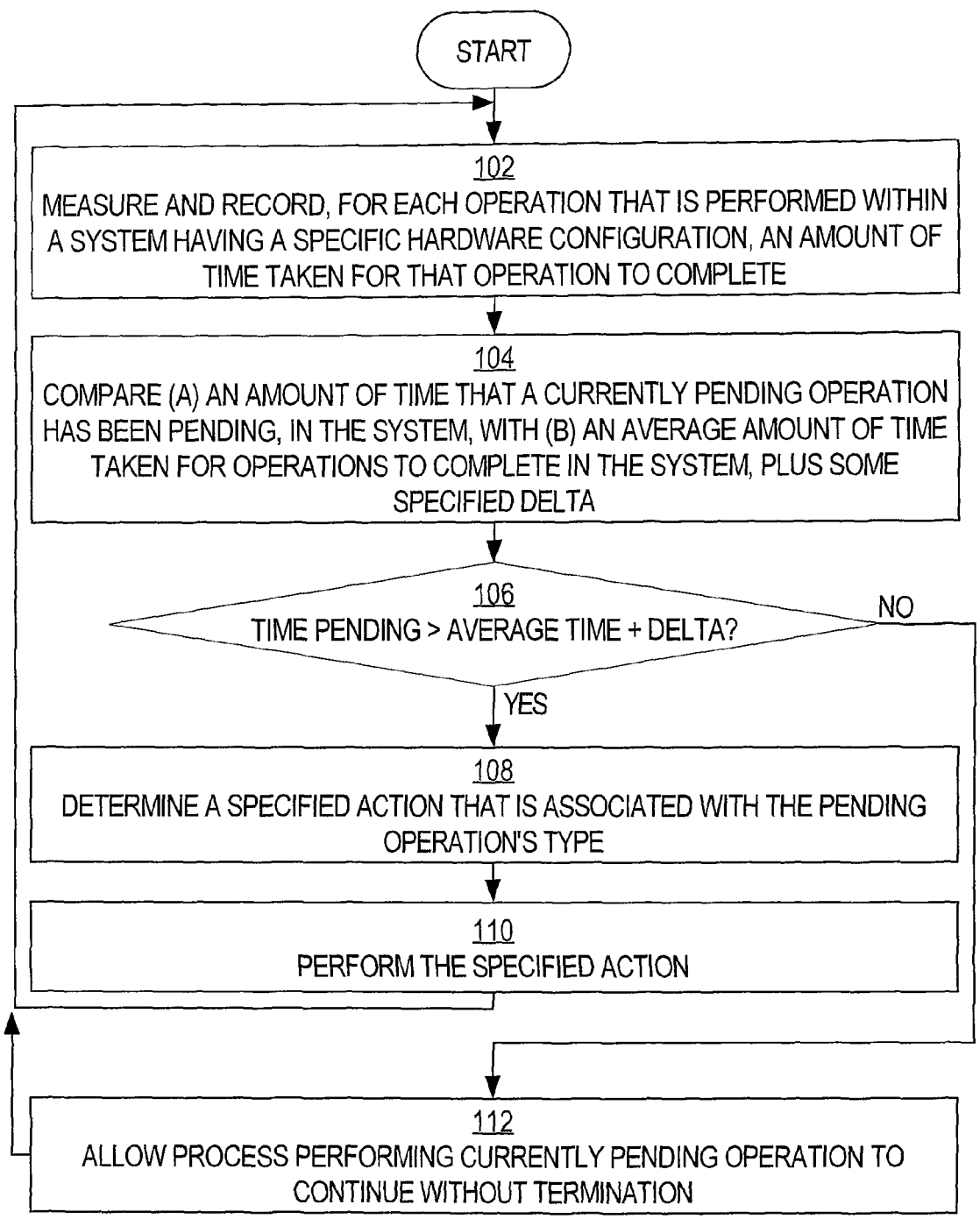
FIG. 1 is a flow diagram that illustrates an example of a technique for automatically performing actions in response to determining that an operation has exceeded an average time taken by operations of the same type within the same hardware configuration, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A conflict resolution mechanism, besides detecting conflict, also collects statistical data regarding how much time certain or all common actions or waits take. For example, the mechanism may collect statistics on disk I/O for each disk device. Statistics may include the longest access time, the shortest access time, and the average access time, for example. Such statistics may be collected over a sliding window of time (e.g., the last X minutes, or the last Y hours, or the last Z days). With the statistical data that the mechanism collects, the mechanism can make a better and more intelligent judgment regarding whether a process is in a "hanging" condition. For example, if the average I/O to a disk is 10 seconds (which is slow, perhaps, due to hardware) for the past hour, and if a process is doing disk I/O to that disk for 5 seconds, then the mechanism will not yet determine that the process is hanging. In order to determine whether the process is hanging, the mechanism looks at the average time and the longest time for the particular actions that the process is performing.

Tracking Operation Performance Times

According to one embodiment of the invention, a human administrator specifies a set of operations that are of particular concern in a database system. The specified set of operations represents the kinds of operations whose performance times are to be tracked and recorded. The operations may be specified with varying degrees of specificity. For example, the administrator may specify that all disk I/O operation times should be tracked. For another example, the administrator may specify that all disk writes (but not necessarily all disk reads) should be tracked. For another example, the administrator may specify that all disk reads (but not necessarily all disk writes) should be tracked. For another example, the administrator may specify that all disk I/O operations performed by a specified process should be tracked. For another example, the administrator may specify that all I/O operations performed relative to a particular data structure (e.g., a named relational table, a named partition, a named tablespace, a set of relational table's rows satisfying specified criteria, a specified query, a specified disk block, etc.) should be tracked. In one embodiment of the invention, after the administrator has specified, through a user interface, the set of operations that are to be tracked, a process persistently stores configuration data that reflects the set of operations.

Thereafter, in one embodiment of the invention, whenever any operation is going to be performed, or starts to be performed, within the database system, a monitoring process or thread determines whether the operation is specified within the set of operations reflected by the configuration data. If the particular operation that is starting to be performed, or is about to be performed, is among the set of operations that are to be tracked, then the monitoring process starts a timer specifically for that particular operation. Because numerous different operations may be ongoing concurrently, several separate timers may be running for those different operations simultaneously. In one embodiment of the invention, the fact that an operation is taking longer than the specified timeout period for that operation does not cause the database system to terminate the operation or the process that is performing that operation. Instead, in such an embodiment of the invention, the operation's performance is allowed to continue for an amount of time that extends even beyond the specified timeout period. When the operation finally finishes, the monitoring process stops the timer that is associated with that particular operation. The monitoring process records, in tracking data, the identity of the operation, and how much time passed between the time that the operation started and the time that the operation finished. For example, if the operation is a read operation, then the monitoring process may record the amount of time that passed between (a) the time that a database server process requested that a particular disk block be read, and (b) the time that data from the particular disk block was returned to the database server process. For another example, if the operation is a write operation, then the monitoring process may record the amount of time that passed between (a) the time that a database server process requested that data be written to disk and (b) the time that a storage subsystem reported back to the database server process that the data had been successfully written to disk.

For each operation whose completion times are being tracked in the tracking data, various items of information may be recorded within the tracking data. For example, in addition to the amount of time taken for the operation to complete, the tracking data may record the identity of the process performing the operation (or the identity of the process that requested the performance of the operation), the type of the operation (e.g., read, write, lock, unlock, etc.), and the target of the operation—either physical or logical or both (e.g., the physical disk that contained the data structure on which the operation was performed, the identity of the data structure (e.g., relational table, row, disk block, partition, tablespace, etc.) on which the operation was performed, etc.). The tracking data also may indicate the date, day of the week, and time of day at which the operation was performed.

As a result of the foregoing technique, the tracking data accumulates information about how long different operations take to complete within a particular database system residing on a particular hardware configuration.

Operation Statistics

In one embodiment of the invention, while tracking data for various different operations is being accumulated in the manner described above, various statistics are computed based on the tracking data for each operation and/or type of operation. In one embodiment of the invention, for each operation or type of operation for which tracking data has been accumulated, an average performance time is computed for that operation by summing up the total amount of time taken to perform each such operation and dividing that sum by the total number of such operations. For example, an average amount of time taken to perform all read operations may be determined by adding up all of the amounts of time taken for all of the read operations (and only read operations) to complete, and then dividing the resulting sum by the total number of read operations reflected in the tracking data. For another example, an average amount of time taken to perform all write operations may be determined by adding up all of the amounts of time taken for all of the write operations (and only write operations) to complete, and then dividing the resulting sum by the total number of write operations reflected in the tracking data. For another example, an average amount of time taken for a particular database server process's operations to complete may be determined by adding up all of the amounts of time taken for all of that database server process' operations (and only those operations) to complete, and then dividing the resulting sum by the total number of that database server process' operations reflected in the tracking data. For another example, an average amount of time taken for all operations performed relative to a specified data structure (e.g., relational table, row, disk block, partition, tablespace, etc.) to complete may be determined by adding up all of the amounts of time taken for all such operations (and only those operations) to complete, and then dividing the resulting sum by the total number of those operations reflected in the tracking data.

Additionally or alternatively, in one embodiment of the operation, a moving average is calculated and maintained, for each of the kinds of operations discussed above (e.g., reads, writes, process-specific, data structure-specific, etc.), for a most recent specified period of time. For example, in calculating the moving average for read operations, the statistic-calculating process may take into account only those read operations (from the tracking data) that have occurred within a specified amount of time (e.g., in the last 10 minutes) from the current time. Various different moving averages may be calculated and maintained for different time periods and for different types of operations. Such moving averages are said to be computed over a "sliding window" of time.

In one embodiment of the invention, additional or alternative statistics are calculated based on the tracking data. In one embodiment of the invention, for each specified type of operation (e.g., reads, writes, process-specific, data structure-specific, etc.), the historically longest amount of time taken for that operation to complete is determined and maintained. In one embodiment of the invention, for each specified type of operation (e.g., reads, writes, process-specific, data structure-specific, etc.), the historically longest amount of time taken for that operation to complete is determined and maintained. Each of the foregoing statistics may be used, in isolation or in combination with each other, in the techniques discussed herein. More specifically, in various embodiments of the invention, one or more of the foregoing statistics may be used, in isolation or in combination, when making a determination of whether a particular process has "hung" (i.e., is no longer functioning correctly but has not yet terminated, or is stuck waiting for a resource), and whether a process ought to be terminated.

Acting Based on Statistics

In one embodiment of the invention, a database server process' (or other process' or thread's) current behavior is compared to the statistics discussed above in order to determine whether to take an action relative to that process and, if so, which action to take. In one embodiment of the invention, for each currently executing database server process that has started an operation that has not yet completed, the amount of time that the process has been waiting for that operation to complete is determined. This amount of time is compared to the average amount of time, or moving average amount of time, that operations of the same type (e.g., reads, writes, or operations performed by the same process, or operations performed relative to the same data structure) have taken to complete.

Some difference between the average (or moving average) and the amount of time that the current operation under consideration has been pending is tolerated; this difference is called the "delta." For example, if the delta is one minute, and if the moving average is 5 minutes, then the system will allow the pending operation under consideration to last for up to a total of 6 minutes before taking any action relative to the pending operation. In one embodiment of the invention, after the operation under consideration has been pending for an amount of time that exceeds the average (or moving) average for that operation type plus the delta (which may vary from operation type to operation type), then an action is taken relative to the operation and/or the process that is performing the operation and/or the process that requested the performance of the operation. For example, in one embodiment of the invention, if the amount of time that an operation has been pending (waiting to complete) exceeds the moving average for the operation's type (as indicated by the statistics calculated based on the recorded performance times) plus the delta, then process that is perform the operation and/or the process that requested the performance of the operation is determined to have "hung," and, in response to this determination, the process is terminated automatically. Such a process may be terminated automatically either by sending a request to the process asking it to exit, thus ending its own execution, or by less gracefully and more forcefully killing the process without its voluntary participation. In one embodiment of the invention, the monitoring process performs any terminations that are determined to be necessary.

A different delta may be specified by a human administrator for each different type of operation. For example, a first delta may be specified for read operations, while a second delta may be specified for write operations. Different deltas may be specified in different systems (which might have different hardware configurations and disk access speeds).

Time-of-Day Specific Averages

In an embodiment of the invention described above, the amount of time that a selected operation has been pending is compared to an observed average (or moving average) total-time-to-complete for all operations of that type. In such an embodiment, all previously performed operations of that type are considered when calculating the average (or moving average), regardless of the time of day at which those previous operations were performed.

However, in an alternative embodiment of the invention, the amount of time that a selected operation has been pending is compared, instead, to an observed average (or moving average) of the time taken for operations that occurred at the same time-of-day as the selected operation to complete. For example, if the selected operation under consideration began at 12:30 in the afternoon, and if a human administrator has defined a time-of-day "slot" as existing from 12:00 noon until 1:00 in the afternoon, then the time that the currently selected operation has been pending will be compared only to the average (or moving average) time taken for other operations that also began sometime between 12:00 noon until 1:00 in the afternoon (on any date). Thus, the fact that a database system might be much busier during certain hours of the day may be taken into account when determining whether the selected operation really is taking an excessively long time to complete when compared to other previous operations of that type.

In one embodiment of the invention, a human administrator defines various "time-of-day slots" or intervals (e.g., 12:00 noon until 1:00 in the afternoon). Data specifying the definition of these intervals is persistently stored in the database system. When averages (or moving averages) are computed in such an embodiment of the invention, the only operations used to compute the averages (or moving averages) to which currently pending operations' times will be compared are those that began during the interval in which the current time-of-day occurs. Thus, in such an embodiment of the invention, if a pending operation occurs during the "8 PM to 6 AM" time slot (as defined by an administrator), then the total time that has passed since the pending operation started is compared to the average execution time of all other previous operations that also stared during the "8 PM to 6 AM" time slot (and only those operations) if an average is being used, and only a most recent subset of those previous operations if a moving average is being used.

In yet another embodiment of the invention, additionally or alternatively, "day-of-week slots" or intervals are defined. In such an embodiment of the invention, the average or moving average to which a pending operation's execution time will be compared is computed based only on the execution times of previous operations that began during the same day of the week (e.g., Sunday, Monday, Tuesday, Wednesday, Thursday, Friday, Saturday) as the pending operations. Clearly, other embodiments of the invention are envisioned in which intervals of other granularities are defined and used in a similar manner to determine an average or moving average. For example, such others intervals might be based on the months of the year rather than days of the week or times of the day. Intervals also may be defined based on combinations of different temporal granularities. For example, one interval might be defined as "Monday from 9 AM to 12 noon," while another interval might be defined as "Tuesday from 1 PM to 5 PM." Such intervals use a combination of both day-of-week and time-of-day temporal granularities.

Operation Types

As is discussed above, in one embodiment of the invention, different averages may be computed for different types of operations, and the amount of time that a particular operation has been pending is compared to the average time of pendency of operations of the same type. As is discussed above, an operation type might be "read" or "write." Other operation types are also possible.

In one embodiment of the invention, an additional type of operation is "network send." This type of operation includes all operations that send data over a network (such as a local area network, wide area network, and/or the Internet). In one embodiment of the invention, an additional type of operation is "network receive." This type of operation includes all operations that wait for data to be received over a network.

Operations also may be defined based on structured query language type and/or size parameters. For example, a type of operation that involves relational table creation may be defined. Where such an operation type is defined, all operations that create tables are deemed to be of that type. For another example, operations that create different table sizes may be defined as different types of operations. Operations that create tables whose sizes fall within a first size range may be defined as being of a first operation type, while operations that create tables whose sizes fall within a second, different size range may be defined as being of a second operation type.

Actions Taken Automatically on Timeout

As is discussed above, in one embodiment of the invention, a monitoring process determines whether a particular operation has "timed out" due to that operation having been pending for an amount of time that exceeds some average (or moving average) for that operation's type, plus a delta (possibly specific to that operation's type also). In response to determining that the particular operation has timed out, the monitoring process automatically takes some action. For example, in one embodiment of the invention, the monitoring process automatically terminates each process that requested or performed an operation that is determined to have timed out. However, in certain embodiments of the invention, the monitoring process may automatically take alternative actions instead or as well.

In one embodiment of the invention, a human administrator defines action data that indicates, for each operation type, the action that the monitoring process is to take in response to a determination that an operation has timed out. Such an action might be, for example, "terminate process." However, another example action, in one embodiment of the invention, is "move process." In such an embodiment of the invention, if an operation is determined to have timed out, then the database server instance that was performing that operation "ships" the operation to another database server instance in the same cluster of database server instances. Such "shipping" may involve sending information about the operation over a network such as a local area network, wide area network, and/or the Internet. Under such circumstances, the recipient database server instance receives the operation and attempts to perform the operation itself, while the sending database server instance no longer devotes any resources to the performance of the operation. In order to determine which database server instance in a cluster is the server instance to which an operation is to be shipped, the monitoring process may examine each other database server instance's average (or moving average) time for operations of that type, and then ship the operation to the database server instance that is associated with the lowest average (or moving average) time for operations of that type.

Example Flow

FIG. 1 is a flow diagram that illustrates an example of a technique for automatically performing actions in response to determining that an operation has exceeded an average time taken by operations of the same type within the same hardware configuration, according to an embodiment of the invention. In block 102, a monitoring process measures and records, for each operation that is performed within a system having a specific hardware configuration, an amount of time taken for that operation to complete. The monitoring process does this for multiple processes, over a period of time.

In block 104, the monitoring process compares (a) an amount of time that a currently pending operation has been pending, in the system, with (b) an average amount of time (which may be a moving average) taken for operations to complete in the system, plus some specified delta. As is discussed above, this comparison is made between operations of the same type, only, in one embodiment of the invention.

In block 106, the monitoring process determines whether the amount of time that the currently pending operation has been pending is greater than the average amount of time described above. If the current pending operation's amount of time is greater than the average, then control passes to block 108. Otherwise, control passes to block 112.

In block 108, the monitoring process determines an action that is associated with the pending operation's type. For example, stored "action data" may indicate that for all "read" type operations, timed-out processes that were waiting on those operations should be terminated. Under such circumstances, the specified action would be "terminate." Control passes to block 110.

In block 110, the monitoring process performs the action that is associated with the operation's type. For example, if the action is "terminate," then the monitoring process may send, to the database server instance process that is waiting for the pending operation to complete, an instruction for that database server instance process to terminate itself. Control passes back to block 102.

Alternatively, in block 112, the monitoring process allows the currently pending operation to continue to pend, without terminating either that operation or the process that is performing that operation. The process that is performing that operation may continue to wait for the operation to complete; the delay in the completion of the operation is assumed to be due to a slow hardware configuration within the system. Control passes back to block 102.

As a result of the techniques described herein, processes are not prematurely terminated due to long operation pendencies when those long operation pendencies are due primarily or solely to the slowness of the hardware relative to which the processes execute. Different "timeout" values are automatically learned for different hardware configurations using the foregoing techniques, and so operations may be allowed to last longer before any action is taken if those operations' pendencies are typical of pendencies of operations executing on the same hardware. Consequently, a greater proportion of processes are able to complete their operations in a database or other system.

Although technique described herein are discussed in the context of processes and operations that are performed in a database system, such as a relational database system, various alternative embodiment of the invention may be performed and used in computing systems other than database systems. For example, any system in which input and/or output operations are performed relative to some storage subsystem may beneficially make use of certain embodiments of the invention discussed above. Techniques described herein might be beneficially used in an operating system that reads and writes to random access memory or a hard disk drive, for example. Technique described herein also might be beneficially used in a file system that reads and writes to a hard disk drive or a redundant array of disks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
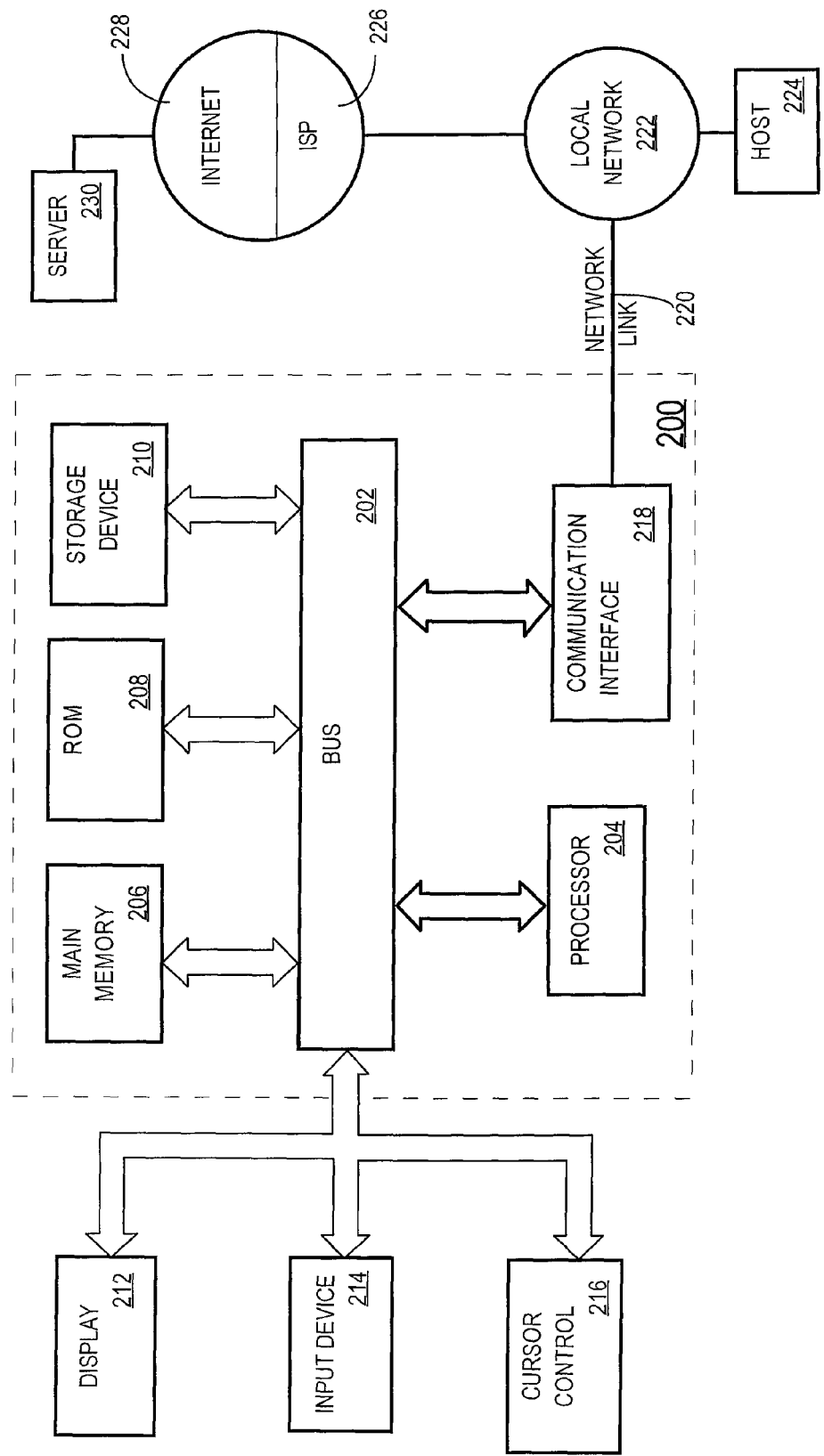
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A computer-implemented method comprising steps of:
   collecting statistics over a period of time regarding amounts of time taken for operations of a particular type to be completed by each of a plurality of processes;
   based on said statistics, determining an average amount of time for the particular type of operation to complete;

determining an amount of time that a particular process has been waiting for an operation of the particular type to complete;

determining whether the amount of time that the particular process has been waiting for the operation of the particular type to complete exceeds the average amount of time determined for operations of the particular type to complete plus a specified non-zero delta amount of time; and terminating the particular process in response to determining that the amount of time that the particular process has been waiting for the operation of the particular type to complete exceeds the average amount of time determined for operations of the particular type to complete plus a specified non-zero delta amount of time;

wherein the steps are performed by one or more computing devices.

2. The method of claim 1, further comprising:

receiving input that defines the particular type; and wherein determining the average amount of time for the particular type of operation to complete comprises adding together only completion times of previously performed operations that are of the particular type, and dividing a result of said adding by a quantity of said previously performed operations that are of the particular type.

3. The method of claim 1, wherein determining an average amount of time for the particular type of operation to complete comprises determining a moving average amount of time for operations of the particular type to complete within a specific hardware configuration during a most recent time interval of a specified duration.

4. The method of claim 1, wherein determining an average amount of time for the particular type of operation to complete comprises determining an average amount of time for read operations only to complete within a specific hardware configuration.

5. The method of claim 1, wherein determining an average amount of time for the particular type of operation to complete comprises determining an average amount of time for write operations only to complete within a specific hardware configuration.

6. The method of claim 1, wherein determining an average amount of time for the particular type of operation to complete comprises determining an average amount of time for operations that target a specified relational database table only to complete within a specific hardware configuration.

7. The method of claim 1, wherein determining an average amount of time for the particular type of operation to complete comprises determining an average amount of time for operations that are performed by a specified process only to complete within a specific hardware configuration.

8. A computer-implemented method comprising steps of:

determining a type of a currently pending operation that is being performed within a specified hardware configuration;

determining a first amount of time has passed since the currently pending operation began;

determining an average amount of time that other operations of said type, and only operations of said type, have taken to complete within said specified hardware configuration;

determining whether said first amount of time exceeds said average amount of time plus a specified non-zero delta amount of time that is specific to said type; and in response to determining that said first amount of time exceeds said average amount of time plus a specified non-zero delta amount of time that is specific to said type, automatically performing a specified action that is associated, via stored data, with said type;

wherein the steps are performed by one or more computing devices.

9. The method of claim 8, wherein the type of currently pending operation is a type of operation that creates database tables in a relational database.

10. The method of claim 8, wherein the type of currently pending operation is a type of operation that creates, in a relational database, database tables having a size that is within a specified range of sizes.

11. The method of claim 8, wherein automatically performing said action comprises instructing a process that is performing said currently pending operation to terminate.

12. The method of claim 8, wherein automatically performing said action comprises:

selecting a particular database server instance from among a plurality of database server instances in a cluster;

wherein selecting the particular database server instance is based on average amounts of time that operations of the type have taken to complete on each database server instance within said cluster; and sending, to the particular database server, over a network, information that describes said operation;

wherein said particular database server receives said information and responsively performs said operation.

13. The method of claim 8, wherein determining the average amount of time that other operations of said type, and only operations of said type, have taken to complete within said specified hardware configuration comprises:

determining a current time-of-day; and determining an average amount of time that other operations of said type that also began during a time-of-day interval that includes said current time-of-day have taken to complete;

wherein said average amount of time does not take into consideration any amounts of time taken by any operations that did not begin during said time-of-day interval.

14. A non-transitory computer-readable storage medium storing instructions which, when executed by one or more processors, cause said one or more processors to perform steps comprising:

collecting statistics over a period of time regarding amounts of time taken for operations of a particular type to be completed by each of a plurality of processes;

based on said statistics, determining an average amount of time for the particular type of operation to complete;

determining an amount of time that a particular process has been waiting for an operation of the particular type to complete;

determining whether the amount of time that the particular process has been waiting for the operation of the particular type to complete exceeds the average amount of time determined for operations of the particular type to complete plus a specified non-zero delta amount of time; and terminating the particular process in response to determining that the amount of time that the particular process has been waiting for the operation of the particular type to complete exceeds the average amount of time determined for operations of the particular type to complete plus a specified non-zero delta amount of time.

15. The computer-readable medium of claim 14, wherein said steps further comprise:

receiving input that defines the particular type; and wherein determining the average amount of time for the particular type of operation to complete comprises adding together only completion times of previously performed operations that are of the particular type, and dividing a result of said adding by a quantity of said previously performed operations that are of the particular type.

16. The computer-readable medium of claim 14, wherein determining an average amount of time for the particular type of operation to complete comprises determining a moving average amount of time for operations of the particular type to complete within a specific hardware configuration during a most recent time interval of a specified duration.

17. The computer-readable medium of claim 14, wherein determining an average amount of time for the particular type of operation to complete comprises determining an average amount of time for read operations only to complete within a specific hardware configuration.

18. The computer-readable medium of claim 14, wherein determining an average amount of time for the particular type of operation to complete comprises determining an average amount of time for write operations only to complete within a specific hardware configuration.

19. The computer-readable medium of claim 14, wherein determining an average amount of time for the particular type of operation to complete comprises determining an average amount of time for operations that target a specified relational database table only to complete within a specific hardware configuration.

20. The computer-readable medium of claim 14, wherein determining an average amount of time for the particular type of operation to complete comprises determining an average amount of time for operations that are performed by a specified process only to complete within a specific hardware configuration.

21. A non-transitory computer-readable storage medium storing instructions which, when executed by one or more processors, cause said one or more processors to perform steps comprising:
   determining a type of a currently pending operation that is being performed within a specified hardware configuration;
   determining a first amount of time has passed since the currently pending operation began;
   determining an average amount of time that other operations of said type, and only operations of said type, have taken to complete within said specified hardware configuration;
   determining whether said first amount of time exceeds said average amount of time plus a specified non-zero delta amount of time that is specific to said type; and
   in response to determining that said first amount of time exceeds said average amount of time plus a specified non-zero delta amount of time that is specific to said type, automatically performing a specified action that is associated, via stored data, with said type.

22. The computer-readable medium of claim 21, wherein the type of currently pending operation is a type of operation that creates database tables in a relational database.

23. The computer-readable medium of claim 21, wherein the type of currently pending operation is a type of operation that creates, in a relational database, database tables having a size that is within a specified range of sizes.

24. The computer-readable medium of claim 21, wherein automatically performing said action comprises instructing a process that is performing said currently pending operation to terminate.

25. The computer-readable medium of claim 21, wherein automatically performing said action comprises:
   selecting a particular database server instance from among a plurality of database server instances in a cluster;
   wherein selecting the particular database server instance is based on average amounts of time that operations of the type have taken to complete on each database server instance within said cluster; and
   sending, to the particular database server, over a network, information that describes said operation;
   wherein said particular database server receives said information and responsively performs said operation.

26. The computer-readable medium of claim 21, wherein determining the average amount of time that other operations of said type, and only operations of said type, have taken to complete within said specified hardware configuration comprises:
   determining a current time-of-day; and
   determining an average amount of time that other operations of said type that also began during a time-of-day interval that includes said current time-of-day have taken to complete;
   wherein said average amount of time does not take into consideration any amounts of time taken by any operations that did not begin during said time-of-day interval.

* * * * *